(12) United States Patent
Li et al.

(10) Patent No.: US 10,808,678 B2
(45) Date of Patent: Oct. 20, 2020

(54) BLADE CAPABLE OF EFFICIENTLY UTILIZING LOW-VELOCITY FLUID AND APPLICATION THEREOF

(71) Applicant: Yibo Li, Lanzhou (CN)

(72) Inventors: Yibo Li, Lanzhou (CN); Feng Li, Lanzhou (CN); Yixiang Cheng, Lanzhou (CN)

(73) Assignee: Yibo Li, Lanzhou (CN)

( * ) Notice: Subject to any disclaimer, the term of this patent is extended or adjusted under 35 U.S.C. 154(b) by 162 days.

(21) Appl. No.: 16/003,132

(22) Filed: Jun. 8, 2018

(65) Prior Publication Data

US 2018/0340512 A1 Nov. 29, 2018

Related U.S. Application Data

(63) Continuation of application No. PCT/CN2016/109064, filed on Dec. 8, 2016.

(30) Foreign Application Priority Data

Dec. 10, 2015 (CN) .......................... 2015 1 0907637
Sep. 22, 2016 (CN) .......................... 2016 1 0842522

(51) Int. Cl.
*F03D 1/06* (2006.01)
(52) U.S. Cl.
CPC ............. *F03D 1/0675* (2013.01); *F03D 1/06* (2013.01); *F03D 1/0633* (2013.01);
(Continued)

(58) Field of Classification Search
None
See application file for complete search history.

(56) References Cited

U.S. PATENT DOCUMENTS 8,011,887 B2 * 9/2011 Fisher .................. F03D 1/0641
416/23
8,303,250 B2 * 11/2012 Mohammed .......... F03D 7/0236
416/23
(Continued)

FOREIGN PATENT DOCUMENTS

CN 102116252 A 7/2011
CN 202065123 U 12/2011
(Continued)

*Primary Examiner* — Brian P Wolcott
*Assistant Examiner* — Jason G Davis
(74) *Attorney, Agent, or Firm* — Kilpatrick Townsend & Stockton, LLP

(57) ABSTRACT

Provided is a blade capable of efficiently utilizing low-velocity fluid. The blade includes a main wing component, the main wing component has a streamlined cross section, an outer profile of which forms a first airfoil, the blade further includes a head wing piece in form of a sheet, the head wing piece has an arc-shaped cross section with a convex surface at one side and a concave surface at the other side, the head wing piece is arranged obliquely above a leading-edge point of the main wing component with the concave surface of the head wing piece facing the main wing component and a first ventilation space is formed between the head wing piece and the main wing component. By improving the configuration of the wing pieces of the blade, Cp of the blade is improved, and the manufacture cost of the blade can be significantly reduced.

10 Claims, 8 Drawing Sheets

(52) U.S. Cl.
CPC ......... *F03D 1/0641* (2013.01); *F03D 1/0683* (2013.01); *F05B 2230/60* (2013.01); *F05B 2240/221* (2013.01); *F05B 2240/301* (2013.01); *F05B 2250/711* (2013.01); *F05B 2250/712* (2013.01); *F05B 2280/6003* (2013.01); *Y02E 10/72* (2013.01); *Y02P 70/50* (2015.11)

(56) References Cited

U.S. PATENT DOCUMENTS

| | | | | |
|---|---|---|---|---|
| 8,647,063 | B2* | 2/2014 | Koike | F03D 1/0675 |
| | | | | 416/223 R |
| 9,151,270 | B2* | 10/2015 | Eisenberg | F03D 1/0675 |
| 9,919,488 | B2* | 3/2018 | Booth | F03D 1/0683 |
| 2011/0142636 | A1* | 6/2011 | Curtin | F03D 1/0658 |
| | | | | 416/62 |
| 2014/0193256 | A1* | 7/2014 | Matsuda | F03D 7/022 |
| | | | | 416/3 |
| 2015/0322916 | A1 | 11/2015 | Zamora | |

FOREIGN PATENT DOCUMENTS

| | | | |
|---|---|---|---|
| CN | 102661239 | A | 9/2012 |
| CN | 102859183 | A | 1/2013 |
| CN | 104254688 | A | 12/2014 |
| DE | 3505489 | | 8/1986 |
| JP | 2009197700 | A | 9/2009 |
| WO | 2005040559 | A1 | 5/2005 |
| WO | 2015044615 | A1 | 4/2015 |

\* cited by examiner

BLADE CAPABLE OF EFFICIENTLY UTILIZING LOW-VELOCITY FLUID AND APPLICATION THEREOF

CROSS REFERENCE TO RELATED APPLICATIONS

This application is a continuation under 35 U.S.C. § 120 of international patent application PCT/CN2016/109064 filed on Dec. 8, 2016. This international patent application PCT/CN2016/109064 claims the benefits of priority of Chinese Patent Application No. 201510907637.3, filed on Dec. 10, 2015, entitled "Blade Capable of Efficiently Utilizing Low-velocity Fluid and Manufacturing Method Therefor", and priority of Chinese Patent Application No. 201610842522.5, filed on Sep. 22, 2016, entitled "Blade Capable of Efficiently Utilizing Low-velocity Fluid and Manufacturing Method Therefor". The entire contents of the above applications are incorporated herein by reference.

TECHNICAL FIELD

The present disclosure relates to a blade for a fluid-dynamic device, and more particularly, to a blade capable of efficiently utilizing low-velocity fluid and application thereof.

BACKGROUND

As is known to the applicant, the wind energy utilization coefficient Cp (also referred as the wind energy utilization efficiency) is the most important performance parameter of a blade; Cp of a blade is relevant with the ratio of a lift force to a drag force (lift-drag ratio) generated when air flows through the blade, and the lift-drag ratio is determined by the streamlined shape constituting the airfoil, therefore, Cp of the blade is determined by the shape of the airfoil constituted. The most essential in the research and development of high-performance wind power generation technologies is to improve Cp of the blade.

The blades of the currently available lift-type wind power generation products each consists of a single wing piece, resulting in the problem of poor performance at a low wind speed. The blades of trust-type (also referred to as drag-type) wind power generation products have a problem of low Cp. One of the key factors for reducing wind power generation cost is to improve the performance of the wind turbines at a low wind speed.

SUMMARY

In view of this, it is necessary to provide a cost-effective blade having improved wind power utilization efficiency and to provide the application of the blade in a fluid-dynamic device, so as to solve the problem of poor performance of the blades of the existing wind power generation products at a low wind speed.

The object is achieved by following technical schemes:

A blade capable of efficiently utilizing low-velocity fluid includes a main wing component, the main wing component has a streamlined cross section, an outer profile of which forms a first airfoil, wherein the blade further includes a head wing piece in form of a sheet, the head wing piece has an arc-shaped cross section with a convex surface at one side and a concave surface at the other side, the head wing piece is arranged obliquely above a leading-edge point of the main wing component with the concave surface of the head wing piece facing the main wing component, and a first ventilation space is formed between the head wing piece and the main wing component.

In one embodiment, an outer profile defined by the convex surface of the head wing piece and part of an upper profile, a trailing-edge point and a lower profile of the main wing component forms a second airfoil and a leading-edge point of the second airfoil is located at a convex profile of the head wing piece.

In one embodiment, a gap between one end of the head wing piece close to the lower profile of the main wing component and the main wing component is an air inlet of the first ventilation space, a gap between one end of the head wing piece close to the upper profile of the main wing component and the main wing component is an air outlet of the first ventilation space, and the air inlet has a greater width than the air outlet of the first ventilation space.

In one embodiment, an air outflow direction of the air outlet of the first ventilation space is along a tangential direction at a corresponding location of the upper profile of the main wing component.

In one embodiment, the main wing component includes one tail wing piece and at least one middle wing piece located between the head wing piece and the tail wing piece, second ventilation spaces are formed between adjacent middle wing pieces and between the middle wing piece and the tail wing piece, respectively, to achieve air communication between the upper profile and the lower profile of the second airfoil, an opening of the second ventilation space close to the lower profile of the second airfoil is an air inlet of the second ventilation space, an opening of the second ventilation space close to the upper profile of the second airfoil is an air outlet of the second ventilation space, and the air inlet has a greater width than the air outlet of the second ventilation space.

In one embodiment, an air outflow direction of the air outlet of the second ventilation space is along a tangential direction at a corresponding location of an upper profile of an adjacent rear middle wing piece or the tail wing piece.

In one embodiment, the at least one middle wing piece has a sheet member at least partially arranged along the upper profile of the second airfoil.

In one embodiment, the middle wing piece includes a first sheet member, the first sheet member has an arc-shaped cross section with a convex surface at one side and a concave surface at the other side, the arc-shaped convex surface of the first sheet member is close to the head wing piece, the first sheet member has one end close to the lower profile of the second airfoil and another end located at the upper profile of the second airfoil.

In one embodiment, the middle wing piece further includes a second sheet member, one end of the second sheet member is connected with one end of the first sheet member close to the lower profile of the second airfoil, and the second sheet member includes a lower section arranged along the lower profile of the second airfoil.

In one embodiment, the lower section of the second sheet member extends towards the head wing piece, the middle wing pieces include at least two first sheet members, the at least two first sheet members are sequentially arranged between the head wing piece and the tail wing piece, the second sheet member and the first sheet member of the middle wing pieces close to the tail wing piece are connected with each other.

In one embodiment, the lower section of the second sheet member extends towards the tail wing piece.

In one embodiment, the first sheet member and the second sheet member connected thereto are formed integrally, and an intersection between the first sheet member and the second sheet member is smooth and rounded.

In one embodiment, the second sheet member further includes a middle section connected with the lower section, and the middle section is bent towards the first sheet member connected with the second sheet member.

In one embodiment, a bending angle between the lower section and the middle section of the second sheet member is an obtuse angle.

In one embodiment, the second sheet member further includes an upper section connected with the middle section at one end, and the other end of the upper section is connected or attached to the concave surface of the first sheet member.

In one embodiment, a first connection member is provided between the middle section of the second sheet member and the concave surface of the first sheet member.

In one embodiment, the middle section and the upper section of the second sheet member form a continuous arc in a cross section, and convex surfaces of the middle section and the upper section of the second sheet member face the concave surface of the first sheet member.

In one embodiment, the lower section of the second sheet member is connected to the first sheet member through a second connection member, and a connection of the second connection member and the second sheet member and a connection of the second connection member and the first sheet member are smooth and rounded.

In one embodiment, a connection of the first sheet member and the lower section of the second sheet member is smooth and rounded and is provided with a first reinforcing member at an inner side thereof.

In one embodiment, the first sheet member and the second sheet member connected thereto are formed integrally.

In one embodiment, the first sheet member and the second sheet member are connected to form a closed cavity, which is provided therein with a filling body.

In one embodiment, the first sheet member, the second sheet member and the filling body are integrated to form a solid middle wing piece.

In one embodiment, the middle wing piece further includes a third sheet member located between the concave surface of the first sheet member and the tail wing piece, the third sheet member includes a lower section and an upper section, the lower section of the third sheet member is arranged along the lower profile of the second airfoil, the upper section of the third sheet member is connected to one end of the lower section of the third sheet member close to the tail wing piece and is bent towards the first sheet member.

In one embodiment, the lower section and the upper section of the third sheet member are formed integrally, and an intersection of the lower section and the upper section of the third sheet member are smooth and rounded.

In one embodiment, the middle wing piece includes a solid wing component, as seen from a cross section of the solid wing component, the solid wing component has a convex surface close to the head wing piece, a concave surface close to the tail wing piece and a lower side arranged along the lower profile of the second airfoil, the lower side is connected with lower ends of the convex surface and the concave surface of the solid wing component, respectively, upper ends of the convex surface and the concave surface of the solid wing component are connected with each other, and the convex surface of the solid wing component is at least partially arranged along the upper profile of the second airfoil.

In one embodiment, a connection of the lower side and the convex surface of the solid wing component and a connection of the lower side and the concave surface of the solid wing component are smooth and rounded.

In one embodiment, the tail wing piece has a streamlined cross section, an outer profile of which forms a third airfoil, a lower profile of the third airfoil is at least partially arranged along the lower profile of the second airfoil, an upper profile of the third airfoil is at least partially arranged along the upper profile of the second airfoil, trailing-edge points of the third airfoil coincide with those of the second airfoil.

In one embodiment, the tail wing piece has a solid structure.

In one embodiment, the tail wing piece includes a fourth sheet member arranged along the upper profile thereof and a fifth sheet member arranged along the lower profile thereof, and two ends of the fourth sheet member are respectively connected with two ends of the fifth sheet member.

In one embodiment, two ends of the fourth sheet member are respectively connected with two ends of the fifth sheet member through a third connection member and a fourth connection member.

In one embodiment, at least one second reinforcing member is arranged between the fourth sheet member and the fifth sheet member.

In one embodiment, the fourth sheet member and the fifth sheet member are formed integrally.

In one embodiment, one end of the fifth sheet member close to the head wing piece is connected with an extending section arranged along the lower profile of the second airfoil.

In one embodiment, one end of the fourth sheet member close to the head wing piece is connected with an attaching section attached with the extending section.

In one embodiment, the attaching section and the fourth sheet member are formed integrally.

In one embodiment, one end of the extending section close to the head wing piece is connected with a bending section bent towards the upper profile of the second airfoil.

In one embodiment, the bending section, the extending section and the fifth sheet member are formed integrally.

In one embodiment, the fourth sheet member and the fifth sheet member are formed integrally.

The present disclosure further provides a blade capable of efficiently utilizing low-velocity fluid, having a streamlined cross section, the cross section is defined by a leading-edge point, a trailing-edge point, and an upper profile and a lower profile for connecting the leading-edge point and the trailing-edge point, an upper outer edge profile surface of the blade is a suction surface of the blade, the upper profile is an intersection line of the suction surface and the cross section; a lower outer edge profile surface of the blade is a pressure surface, the lower profile is an intersection line of the pressure surface and the cross section; the blade includes a group of wing components with a ventilation space formed between adjacent wing components; wherein the wing components include one head wing piece and one tail wing piece, or include one head wing piece, at least one middle wing piece and one tail wing piece; the head wing piece is close to the leading-edge point and arranged obliquely above the leading-edge point, the tail wing piece is close to the trailing-edge point, the middle wing piece is arranged between the head wing piece and the tail wing piece; the head wing piece is an arc-shaped sheet having a convex surface at one side and a concave surface at the other side, the convex surface of the head wing piece faces away from the trailing-edge point; the upper profile of the cross section of the blade is defined by a convex surface of the head wing piece and an upper part or part of the upper part of the tail wing piece, or defined by a convex surface of the head wing piece and upper parts or part of upper parts of the middle wing piece and the tail wing piece; the lower profile of the cross section of the blade is defined by a lower part or part of the lower part of the tail wing piece, or defined by lower parts or part of lower parts of the middle wing piece and the tail wing piece.

The present disclosure further provides a use of the blade capable of efficiently utilizing low-velocity fluid described above as a blade in a vertical axis wind turbine, a vertical axis hydraulic turbine that generates electric power using tidal flow, a horizontal axis wind turbine, a hydraulic turbine, a steam turbine or a thruster.

The present disclosure has advantageous effects as follows:

By improving the configuration of the wing pieces of the blade, Cp of the blade for the present disclosure is far higher than that of the single-wing blade and is not less than that of the multi-wing fluid-collecting blade having the same outer profile at an average wind speed of 2-13 m/s, thereby ensuring the performance of the blade. In addition, sheet members are used instead of the prior wing, accordingly, the forming of the prior wing of the blade can be replaced by the forming of sheet members, therefore, the whole manufacture mold can be replaced with a plurality of sub molds, thereby reducing the size, manufacture difficulty and cost of the mold. And the highly efficient manufacture process, such as, rolling, stamping and extrusion, can be applied, thus the manufacture cost of the blade can be significantly reduced, particularly by 20%-50% (the higher the unit capacity of the wind turbine, the higher the reduction degree of the cost). Further, the components of the blade for the present disclosure can be manufactured separately, which makes it possible to assemble these components into a blade on the installation site of the wind turbine, thereby significantly reducing the transport cost of a large and middle-sized blade.

DETAILED DESCRIPTION OF EMBODIMENTS

Figure 1A:
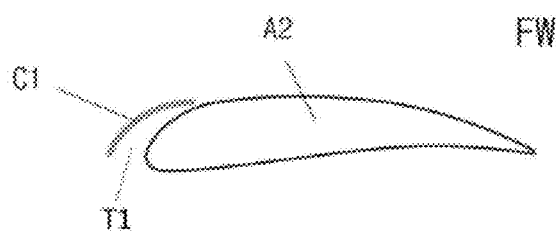
FIG. 1a to FIG. 1c are schematic structural views of the blades capable of efficiently utilizing low-velocity fluid according to Embodiments 1 of the present invention.

In order to make the purposes, technical solutions and advantages of the present disclosure to be understood more clearly, the present disclosure will be described in further details with the accompanying drawings and the following embodiments. It should be understood that the specific embodiments described herein are merely examples to illustrate the present disclosure, not to limit the present disclosure.

For ease of description of specific embodiments, the codes of the blades of the present disclosure are firstly described, so as to facilitate understanding of the relevant terms and parameters illustrating the blades of the present disclosure in the drawings and the description. The blades of the present disclosure are represented by a general formula of FW(n+m)nm, where n represents the number of wing pieces in form of sheet (including: a head wing piece in form of an arc-shaped sheet, a middle wing piece having an arc-shaped structure, a two-part one-folded structure, an S-like shape or a C-like shape), m represents the number of wing pieces in form of a curved surface body or a solid block (including: a middle wing piece having a a-like shape or an airfoil-like shape, a tail wing piece having an airfoil structure or a duckbill shape or an upturned duckbill shape, a middle/tail wing piece in form of a solid block), and (n+m) is a sum of n and m. In addition, the above general formula may include a letter representing a reference airfoil, indicating that the outer profile of the blade forms a specific standard airfoil if necessary, for example, FW(n+m)nmL indicates that the standard airfoil is a LF-series airfoil, and FW(n+m)nmN indicates that the standard airfoil is NACA-series airfoil.

Some of the blades of the present disclosure have logical recurrence in configurations of wing pieces. These blades can be classified into three classes, and the formula of each class should reflect characteristics of that class correspondingly. With respect to FW(n+m)nm, when m or n for one class of blades is a constant value, and the number of the wing pieces having logical recurrence in configuration can be reflected by (n+m) minus this constant value without the need of using a particular value to represent n or m, then one letter can be used to replace n or m to indicate the logical recurrence of configurations of the corresponding wing pieces.

Specifically, blades represented by FW(1+m)1B consist of one sheet wing piece C1 and m wing pieces B in form of a curved surface body, and wherein the middle wing pieces among the m wing pieces B are σ-like shaped and have logical recurrence in the configuration. FW31B shown in FIG. 6a, FIG. 6b, FIG. 6d, FIG. 6h, FIG. 6l and FIG. 8a, FW41B, FW51B and FW61B orderly shown in FIG. 5, FIG. 6e, FIG. 6f, FIG. 6g, FIG. 6i, FIG. 6j, FIG. 6k, FIG. 6m, FIG. 6n, FIG. 6o, FIG. 8b, FIG. 8c, and FIG. 8d are examples of this class of blades.

Figure 4:
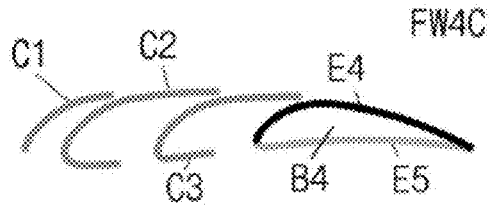
FIG. 4 is a schematic structural view of the blade capable of efficiently utilizing low-velocity fluid according to Embodiments 4 of the present invention.

Blades represented by FW(n+1)C1 consist of n sheet wing pieces C and one wing piece B in form of a curved surface body, and wherein the middle wing pieces among the n sheet wing pieces C are C-like shaped and have logical recurrence in configuration. FW4C1 shown in FIG. 4 is one example of this class of blades.

Figure 3A:
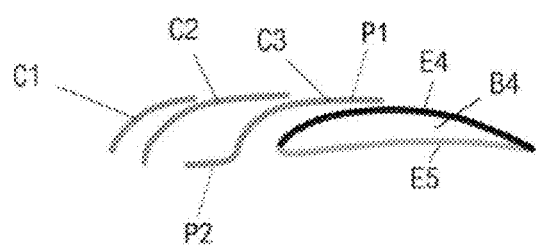
FIG. 3a to FIG. 3b are schematic structural views of the blades capable of efficiently utilizing low-velocity fluid according to Embodiments 3 of the present invention.
Figure 3B:
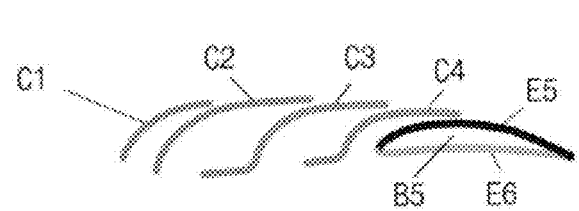

Blades represented by FW(n+1)S1 consist of n sheet wing pieces C and one wing piece B in form of a curved surface body, and wherein the middle wing pieces among the n sheet wing pieces C are S-like shaped and have logical recurrence in configuration. FW4S1 and FW5S1 orderly shown in FIG. 3b are examples of this class of blades.

If classifying the application capacity of the blades according to the numbers n and m of the pieces, the blade having n and m ranged from 1 to 3 ($1 \le n \le 3$, $1 \le m \le 3$) is applicable to small- and micro-sized wind turbines, the blade having n and m ranged from 1 to 8 ($1 \le n \le 8$, $1 \le m \le 8$) is applicable to small- and medium-sized wind turbines, the blade having n and m ranged from 1 to 18 ($1 \le n \le 18$, $1 \le m \le 18$) is applicable to medium- and large-sized wind turbines, and the blade having n and m ranged from 1 to 30 ($1 \le n \le 30$, $1 \le m \le 30$) is applicable to large-sized wind turbines.

Figure 12:
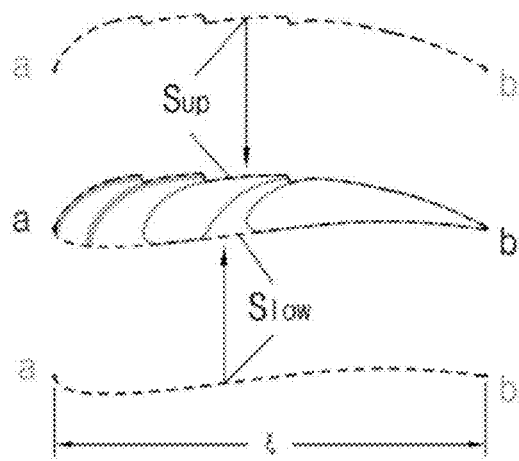
FIG. 12 is a schematic sectional view illustrating the outer profile envelope, the suction surface $S_{up}$ and the pressure surface $S_{low}$ of the blade capable of efficiently utilizing low-velocity fluid of the present disclosure.

FIG. 12 shows an envelope of the outer profile of the blade in dashed line, wherein the suction surface (upper surface) $S_{up}$ and the pressure surface (lower surface) $S_{low}$ are bounded by the leading-edge point a and the trailing-edge point b of the blade and are shown separately in the upper and lower parts, and the distance between a and b is the wing chord length (chord length for short) of the blade.

Figure 14:
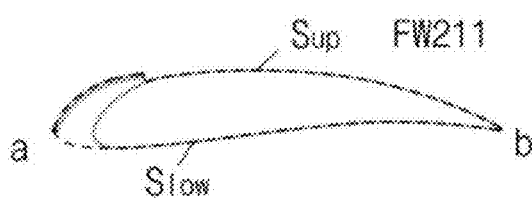
FIG. 14 is a schematic sectional view illustrating the outer profile envelope, the suction surface $S_{up}$ and the pressure surface $S_{low}$ of the blades capable of efficiently utilizing low-velocity fluid of the present disclosure in four different configurations.
Figure 14:
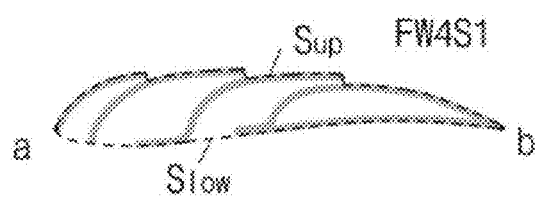
Figure 14:
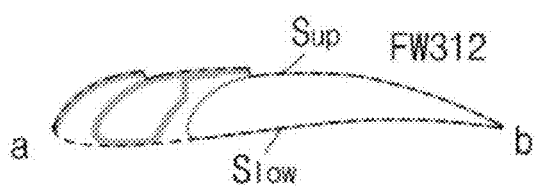
Figure 14:
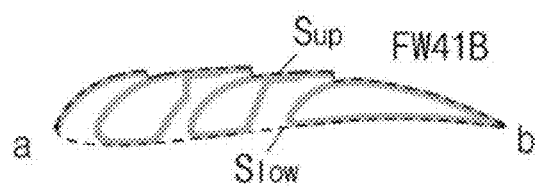

FIG. 14 shows, in dashed line, the suction surface $S_{up}$ and the pressure surface $S_{low}$ bounded by the leading-edge point a and the trailing-edge point b of the FW211, FW4S1, FW312 and FW41B blades of the present disclosure.

Embodiments 1

Figure 1B:
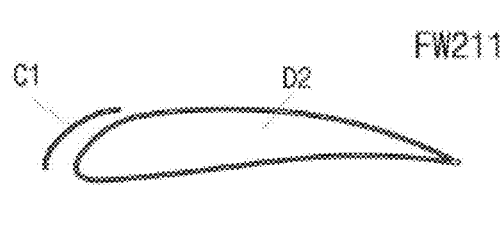
Figure 1C:
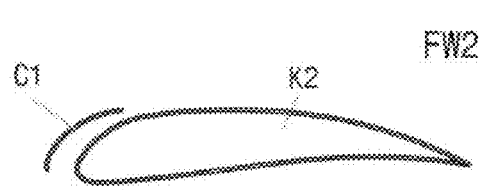

As shown in FIG. 1a to FIG. 1c, the blade capable of efficiently utilizing low-velocity fluid of the present disclosure includes a main wing component A2, D2, K2, the main wing component has a streamlined cross section, an outer profile of which forms a first airfoil; the blade further includes a head wing piece C1 in form of a sheet, the head wing piece has an arc-shaped cross section with a convex surface at one side and a concave surface at the other side, the head wing piece is arranged obliquely above a leading-edge point of the main wing component with the concave surface of the head wing piece facing the main wing component, and a first ventilation space T1 is formed between the head wing piece and the main wing component.

An outer profile defined by the convex surface of the head wing piece and part of an upper profile, a trailing-edge point and a lower profile of the main wing component forms a second airfoil, and a leading-edge point of the second airfoil is located at the convex profile of the head wing piece. The surface defined by the upper profile of the second airfoil is a suction surface, and the surface defined by the lower profile of the second airfoil is a pressure surface of the blade.

Furthermore, a gap between one end of the head wing piece close to the lower profile of the main wing component and the main wing component is an air inlet of the first ventilation space, a gap between one end of the head wing piece close to the upper profile of the main wing component and the main wing component is an air outlet of the first ventilation space, and the air inlet has a greater width than the air outlet of the first ventilation space.

Embodiments 2

When the blade for the present disclosure is utilized in a large-capacity fluid-dynamic device (a wind turbine), the main wing component formed by a single wing cannot meet the requirement, and the main wing component should further include one tail wing piece and at least one middle wing piece located between the head wing piece and the tail wing piece, wherein second ventilation spaces T2 are formed between adjacent middle wing pieces and between the middle wing piece and the tail wing piece, respectively, to achieve air communication between the upper profile and the lower profile of the second airfoil; an opening of the second ventilation space close to the lower profile of the second airfoil is an air inlet of the second ventilation space, and an opening of the second ventilation space the second ventilation space close to the upper profile of the second airfoil is an air outlet of the second ventilation space.

Figure 13:
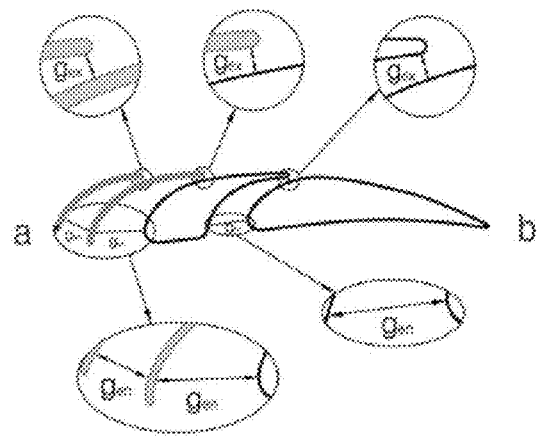
FIG. 13 is a schematic sectional view illustrating the first ventilation space and the second ventilation space of the blade capable of efficiently utilizing low-velocity fluid of the present disclosure.

As shown in FIG. 13, in the cross section of the blade, the air inlets of the first ventilation space and the second ventilation space are located on the side where the lower profile of the second airfoil of the blade is located, the air outlets of the first ventilation space and the second ventilation space are located on the side where the upper profile of the second airfoil of the blade is located, and the width $g_{en}$ of the air inlets are greater than the width $g_{ex}$ of the air outlets. The parts of the first ventilation space and the second ventilation space close to the suction surface (the upper profile of the second airfoil) are gradually narrowed along the airflow direction. An air outflow direction of the air outlet of the first ventilation space is along a tangential direction at a corresponding location of the upper profile of the main wing component. An air outflow direction of the air outlet of the second ventilation space is along a tangential direction at a corresponding location of the upper profile of an adjacent rear middle wing piece or the tail wing piece.

Preferably, the at least one middle wing piece has a sheet member at least partially arranged along the upper profile of the second airfoil.

Figure 2:
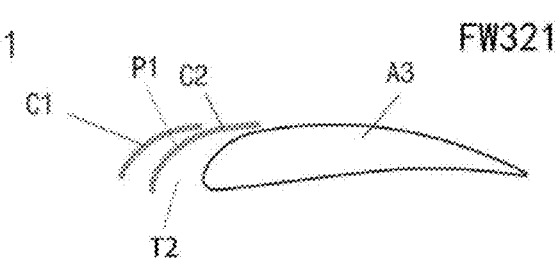
FIG. 2 is a schematic structural view of the blade capable of efficiently utilizing low-velocity fluid according to Embodiments 2 of the present invention.

As shown in FIG. 2, the middle wing piece C2 includes a first sheet member P1, the first sheet member has an arc-shaped cross section with a convex surface at one side and a concave surface at the other side, the arc-shaped convex surface of the first sheet member is close to the head wing piece, the first sheet member has one end close to the lower profile of the second airfoil and another end located at the upper profile of the second airfoil.

Embodiments 3

The embodiment 3 is a variation of the embodiment 2. In Embodiments 3, as shown in FIG. 3a and FIG. 3b, the middle wing pieces C3, C4 further include at least one second sheet member, wherein one end of the second sheet member is connected with one end of the first sheet member close to the lower profile of the second airfoil, and the second sheet member includes a lower section P2 arranged along the lower profile of the second airfoil.

Specifically, the lower section of the second sheet member extends towards the head wing piece to form an S-like shaped middle wing piece, the middle wing pieces include at least two first sheet members, the at least two first sheet members are sequentially arranged between the head wing piece and the tail wing piece, and the second sheet member is connected with the first sheet member of the middle wing piece close to the tail wing piece.

Embodiments 4

The embodiment 4 differs from the embodiment 3 in that, as shown in FIG. 4, the lower section of the second sheet member extends towards the tail wing piece to form a C-like shaped middle wing piece.

To facilitate manufacturing, in Embodiments 3 and 4, the first sheet member and the second sheet member connected thereto are formed integrally, and the intersections between the first sheet member and the second sheet member are smooth and rounded.

Embodiments 5

The embodiment 5 is a variation of the embodiment 4. In Embodiments 5, as shown in FIG. 5, the second sheet member further includes a middle section P3 connected with the lower section at one end, the middle section is bent towards the first sheet member connected with the second sheet member, and a bending angle between the lower section and the middle section of the second sheet member is an obtuse angle.

Embodiments 6

Figure 6A:
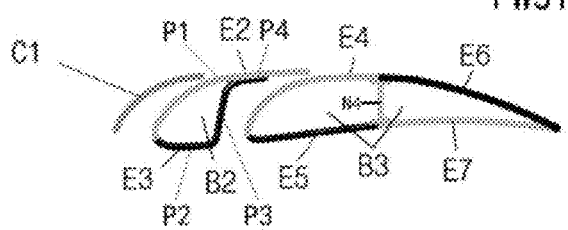
FIG. 6a to FIG. 6o are schematic structural views of the blades capable of efficiently utilizing low-velocity fluid according to Embodiments 6 of the present invention.
Figure 6B:
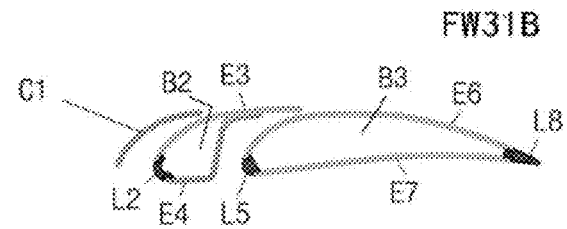
Figure 6C:
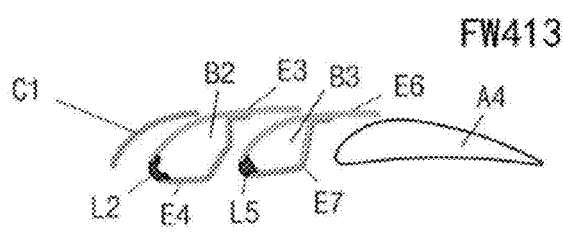
Figure 6D:
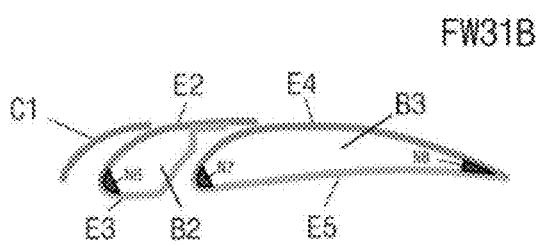
Figure 6E:
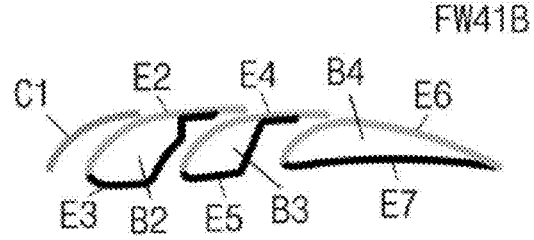
Figure 6F:
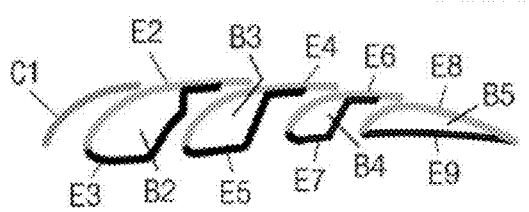
Figure 6G:
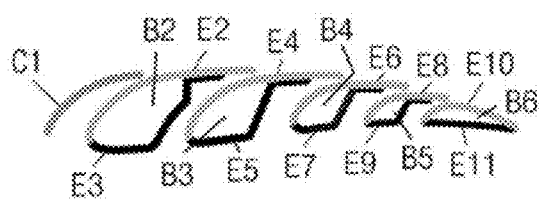

To improve the strength of the middle wing piece, the embodiment 5 is varied to obtain the embodiment 6. In Embodiments 6, as shown in FIG. 6a to FIG. 6o, the second sheet member further includes an upper section P4 connected with the middle section P3 at one end and the other end of the upper section P4 is connected or attached to the concave surface of the first sheet member Pl, thereby forming a a-like shaped middle wing piece.

Figure 5:
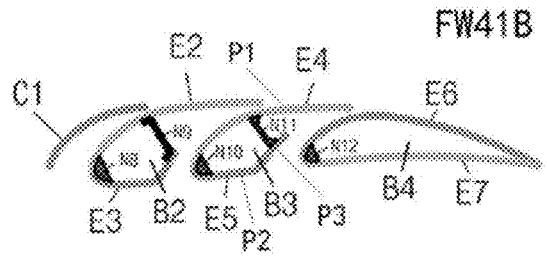
FIG. 5 is a schematic structural view of the blade capable of efficiently utilizing low-velocity fluid according to Embodiments 5 of the present invention.
Figure 6H:
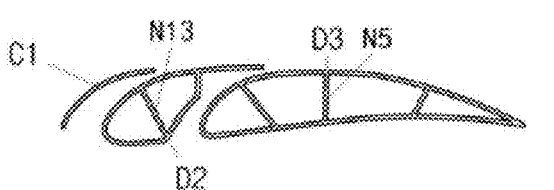
Figure 6I:
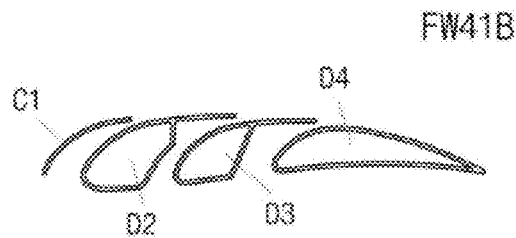
Figure 6J:
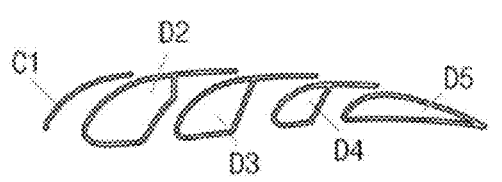
Figure 6K:
Figure 6L:
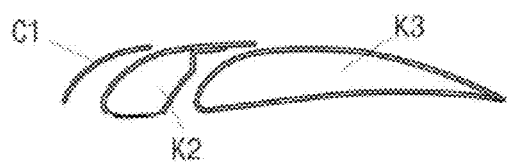
Figure 6M:
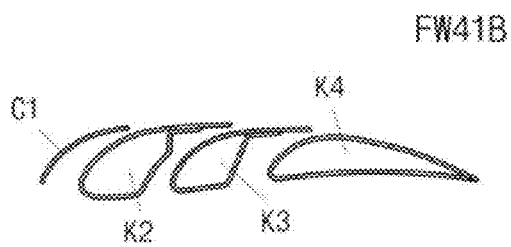
Figure 6N:
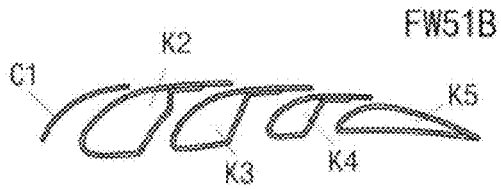
Figure 6O:

To further improve the strength of the middle wing piece, as shown in FIG. 5 and FIG. 6h, first connection members N9, N11 and N1 may be provided between the middle section of the second sheet member and the concave surface of the first sheet member.

Preferably, as shown in FIG. 6b and FIG. 6c, the lower section of the second sheet member is connected to the first sheet member through the second connection member L2, and a connection of the second connection member and the second sheet member and a connection of the second connection member and the first sheet member are smooth and rounded.

In another preferred solution, as shown in FIG. 5 and FIG. 6d, the connection of the first sheet member and the lower section of the second sheet member is smooth and rounded, and is provided with a first reinforcing member N8, N6 at an inner side thereof.

Embodiments 7

Figure 7A:
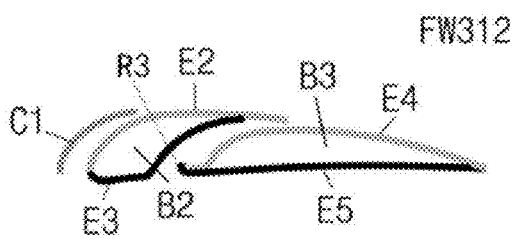
FIG. 7a to FIG. 7c are schematic structural views of the blades capable of efficiently utilizing low-velocity fluid according to Embodiments 7 of the present invention.
Figure 7B:
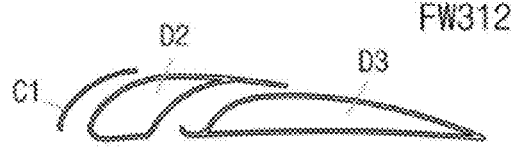
Figure 7C:
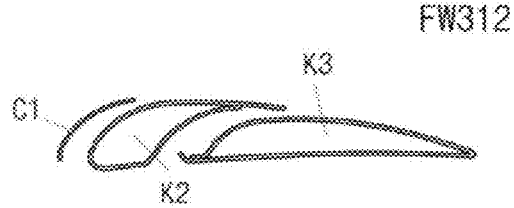
Figure 8A:
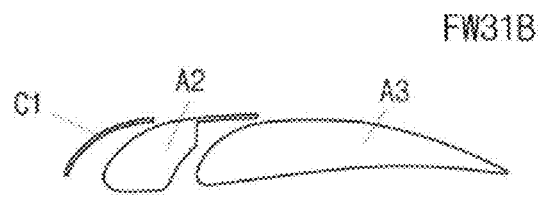
FIG. 8a to FIG. 8d are schematic structural views of the blade capable of efficiently utilizing low-velocity fluid according to Embodiments 8 of the present invention.
Figure 8B:
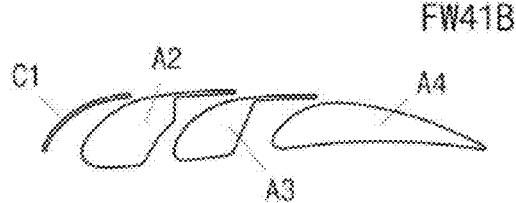
Figure 8C:
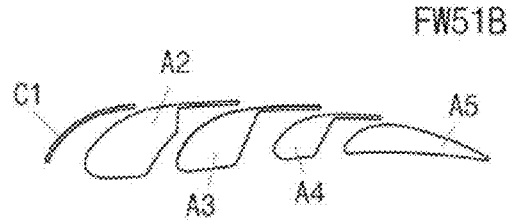
Figure 8D:
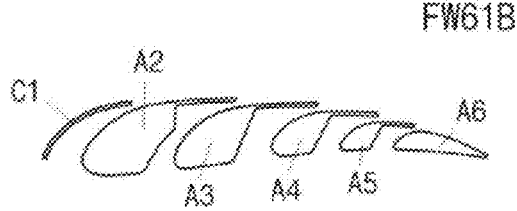

The embodiment 7 is similar to the embodiment 6. In Embodiments 7, as shown in FIG. 7a to FIG. 7c, the cross sections of the middle section and the upper section of the second sheet member define a continuous arc shape, and the arc-shaped convex surface of the middle section and the upper section of the second sheet member face the concave surface of the first sheet member, thereby forming an airfoil-like shaped middle wing piece.

To facilitate manufacture and to reduce the manufacture cost, the first sheet member and the second sheet member connected thereto may be formed integrally to from a hollow middle wing piece. As shown in FIG. 6h to FIG. 6o and in FIG. 7b, the middle wing pieces of FIG. 6h to FIG. 6k and of FIG. 7b are manufactured by extrusion forming; and the middle wing pieces of FIG. 6l to FIG. 6o are manufactured by processing a separate sheet member by sheet metal process in combination with press forming.

Embodiments 8

The embodiment 8 differs from the embodiment 7 in that, the middle wing piece of the embodiment 8 has a solid structure, in other words, the closed cavity formed by connecting the first sheet member with the second sheet member is provided therein with a filling body A2, A3, or A4.

As shown in FIG. 8a to FIG. 8d, the first sheet member, the second sheet member and the filling body are integrated together to form a middle wing piece having a solid structure.

Embodiments 9

Figure 9:
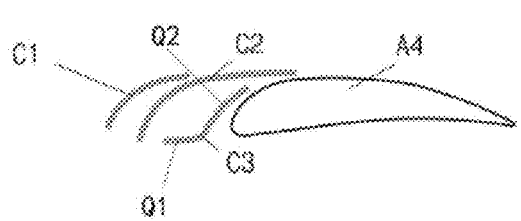
FIG. 9 is a schematic structural view of the blade capable of efficiently utilizing low-velocity fluid according to Embodiments 9 of the present invention.

The embodiment 9 is a variation of the embodiment 2. In Embodiments 9, as shown in FIG. 9, the middle wing piece further includes a third sheet member C3 located between the concave surface of the first sheet member C2 and the tail wing piece A4; the third sheet member includes a lower section Q1 and an upper section Q2, the lower section of the third sheet member is arranged along the lower profile of the second airfoil, the upper section of the third sheet member is connected to one end of the lower section close to the tail wing piece, and is bent towards the first sheet member, thus a middle wing piece having a two-part single-angled structure.

Preferably, the lower section and the upper section of the third sheet member are formed integrally, and an intersection of the lower section and the upper section of the third sheet member is smooth and rounded.

Embodiments 10

Figure 10A:
FIG. 10a to FIG. 10c are schematic structural views of the blades capable of efficiently utilizing low-velocity fluid according to Embodiments 10 of the present invention.
Figure 10B:
Figure 10C:

The middle wing piece further includes at least one solid wing component in addition to the sheet members described in the above embodiments; as shown in FIG. 10a to FIG. 10c, as seen from the cross section of the solid wing component, the solid wing component has a convex surface close to the head wing piece, a concave surface close to the tail wing piece and a lower side arranged along the lower profile of the second airfoil, the lower side is connected with lower ends of the convex surface and the concave surface of the solid wing component, respectively, the upper ends of the convex surface and the concave surface of the solid wing component are connected, and the convex surface of the solid wing component is at least partially arranged along the upper profile of the second airfoil.

Preferably, a connection of the lower side and the convex surface of the solid wing component and a connection of the lower side and the concave surface of the solid wing component are smooth and rounded.

Embodiments 11

The tail wing piece of the main wing component may have various forms. The tail wing piece has a streamlined cross section, an outer profile of which forms a third airfoil, a lower profile of the third airfoil is at least partially arranged along the lower profile of the second airfoil, an upper profile of the third airfoil is at least partially arranged along the upper profile of the second airfoil, trailing-edge points of the third airfoil coincide with those of the second airfoil.

As shown in FIG. 1a, FIG. 2, FIG. 6c, FIG. 8a to FIG. 8d, FIG. 9 and FIG. 10a to FIG. 10c, the tail wing piece has a solid structure.

As shown in FIG. 3a, FIG. 3b, FIG. 4a and FIG. 6e to FIG. 6g, the tail wing piece includes a fourth sheet member arranged along the upper profile thereof and a fifth sheet member arranged along the lower profile thereof, and the two ends of the fourth sheet member are respectively connected with the two ends of the fifth sheet member.

As shown in FIG. 6b, the two ends of the fourth sheet member E6 are respectively connected with the two ends of the fifth sheet member E7 through a third connection member L5 and a fourth connection member L8.

As shown in FIG. 6a and FIG. 6h, to improve the strength of the tail wing piece, at least one second reinforcing member N4, N5 is arranged between the fourth sheet member and the fifth sheet member, wherein as shown in FIG. 6h, there are a plurality of second reinforcing members N5 in the tail wing piece, and these second reinforcing members are distributed in the front, middle and rear sections of the tail wing piece.

Embodiments 12

Figure 11:
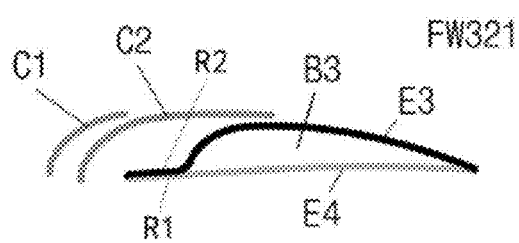
FIG. 11 is a schematic structural view of the blade capable of efficiently utilizing low-velocity fluid according to Embodiments 12 of the present invention.

The embodiment 12 is a variation of the embodiment 11. As shown in FIG. 11, the embodiment 12 differs from the embodiment 11 in that, one end of the fifth sheet member E4 close to the head wing piece is connected with an extending section R1, which is arranged along the lower profile of the second airfoil, one end of the fourth sheet member E3 close to the head wing piece is connected with an attaching section R2 attached with the extending section, thereby forming a duckbill-like shaped structure.

Preferably, the attaching section and the fourth sheet member are formed integrally.

As shown in FIG. 7a and FIG. 7c, one end of the extending section close to the head wing piece is connected with a bending section R3 bent towards the upper profile of the second airfoil, thereby forming an upturned duckbill-like shaped structure.

As shown in FIG. 7b, the bending section, the extending section and the fifth sheet member are formed integrally.

As shown in FIG. 1b, FIG. 1c, FIG. 5, FIG. 6d, FIG. 6h to FIG. 6o, FIG. 7b and FIG. 7c, the fourth sheet member and the fifth sheet member are formed integrally, similar to the manufacture of the middle wing piece, while the tail wing piece may be manufactured by extrusion forming or by sheet metal process in combination with pressure forming alternatively.

Figure 15A:
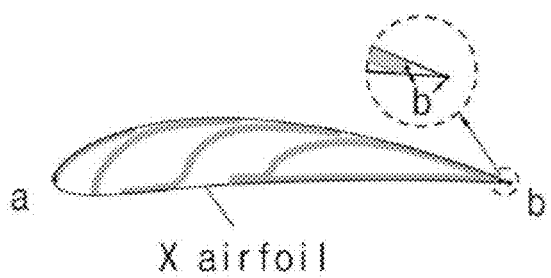
FIG. 15a to FIG. 15b are schematic sectional views of the blades of FIG. 3a, the outer profiles of which are designed according to X and Y airfoil specifications, respectively.
Figure 15B:
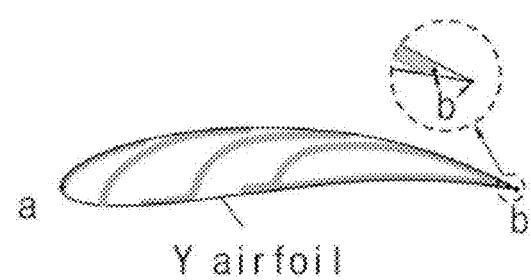
Figures 16A, 16B, 16C, 16D:
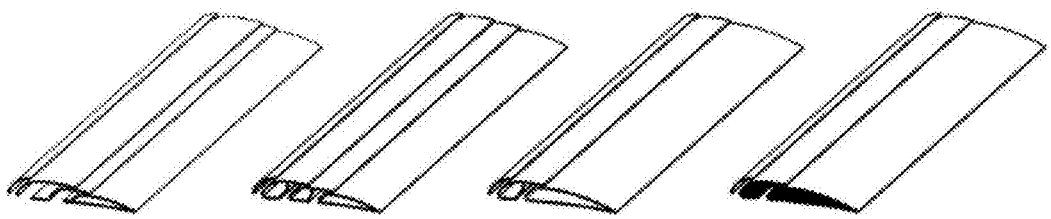
FIG. 16a to FIG. 16d are perspective views illustrating four examples of the blades capable of efficiently utilizing low-velocity fluid of the present disclosure, respectively.

As shown in FIG. 15a and FIG. 15b, the outer profiles of the second airfoil of the blade for the present disclosure are designed according to X and Y airfoil specifications, respectively. Since the trailing edge of the blade cannot (not necessarily) be made as sharp as the airfoil, the leading-edge points of the blade coincide with those of the airfoil, while trailing-edge points b of the blade do not coincide with those of the airfoil.

FIG. 16a to FIG. 16d show three-dimensional illustration of a FW4S1 blade of FIG. 3a, a FW41B blade of FIG. 6f, a FW31B blade of FIG. 6e and a FW312 blade of FIG. 10a, respectively. The blade of the present disclosure can be formed by fixing the head wing piece, the middle wing piece and the tail wing piece together through an external frame (not shown in the drawings).

Figure 17:
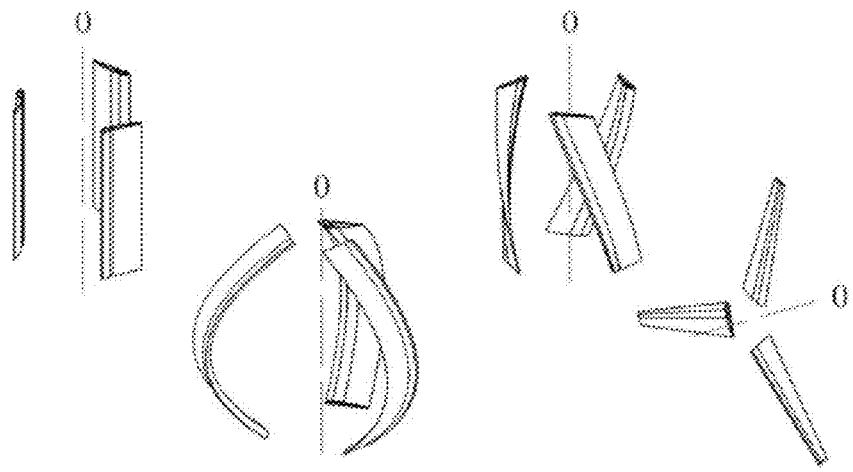
FIG. 17 schematically illustrates four application modes of the blade capable of efficiently utilizing low-velocity fluid of the present disclosure.

As shown in FIG. 17, taking a three-blade wind turbine as an example, the blade of the present disclosure can be applied in the wind turbine in four modes. Where, in three application modes, a H-vertical axis type, a Q-vertical axis type and a helix-vertical axis type, the chord length of the blade remains constant along the extending direction; in the rest one application mode, a horizontal axis type, the chord length of the blade gradually decreases along the outward direction of the radius of the wind turbine, wherein 0 represents the rotation axis of the wind turbine.

Furthermore, the blade of the present disclosure can also be used as a blade of a hydraulic turbine, a steam turbine or a thruster, especially, as a vertical axis hydraulic turbine that generates electric power using tidal flow.

Figure 18:
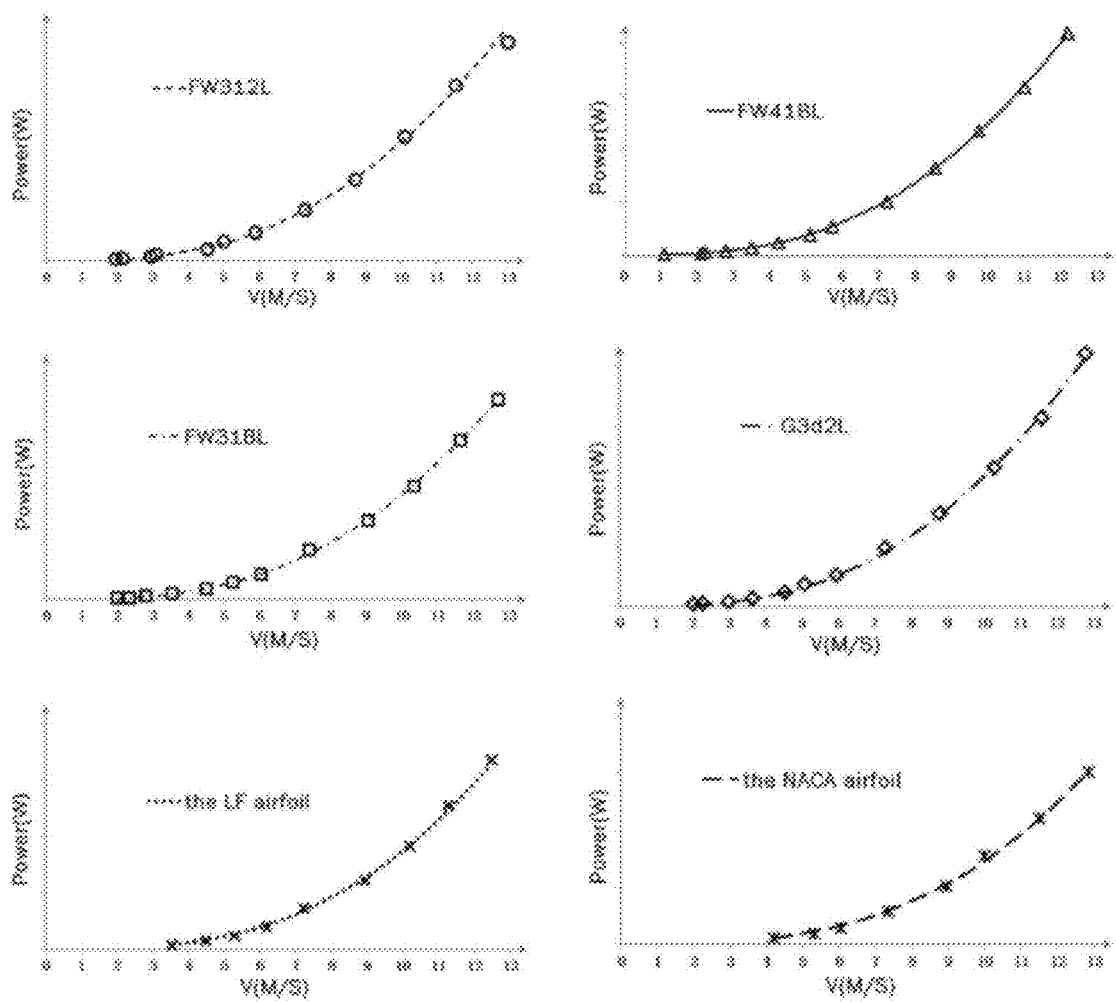
FIG. 18 shows power test results of the blades of three examples of the present disclosure, a three-wing fluid-collecting blade and two kinds of single-wing blades.
Figure 19:
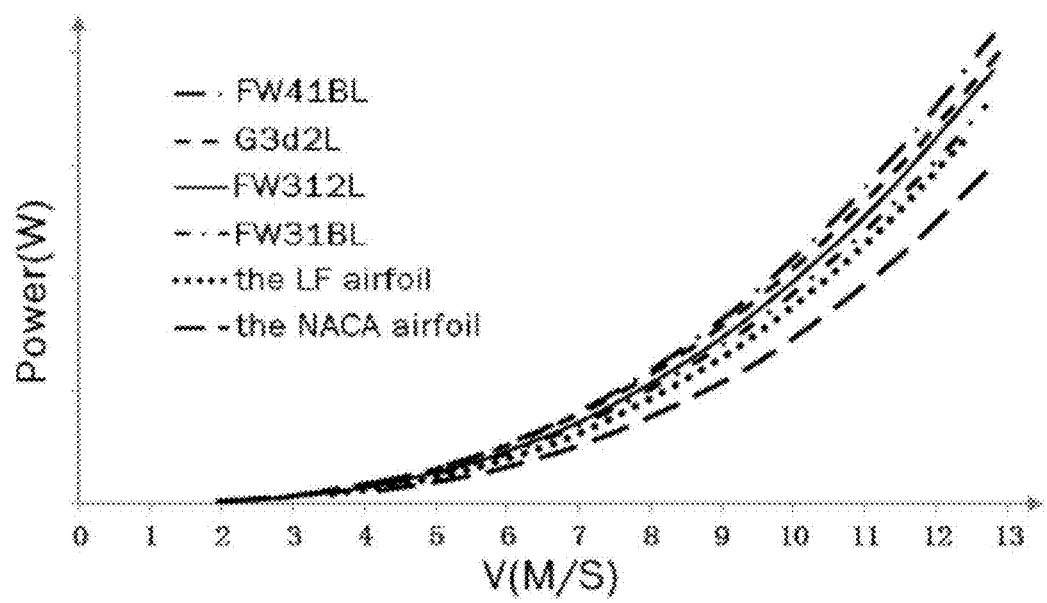
FIG. 19 is a diagram illustrating comparison of power of the six kinds of blades shown in FIG. 18.

To verify the technical effects of the blade capable of efficiently utilizing low-velocity fluid of the present disclosure, six kinds of blades are respectively mounted on an H-vertical axis wind turbine, the values of power thereof are measured with varying wind speeds so as to fit out power curves. FIG. 18 shows the power curves of each blade, and FIG. 19 shows comparison between power curves of FIG. 18. The six kinds of blades are as follows: FW41BL, FW31BL and FW312L blades of the present disclosure designed using a LF airfoil as a standard airfoil of the outer profile of blades, a three-wing fluid-collecting G3d2L blade, a blade of a LF airfoil as a standard airfoil of the outer profiles of the above four kinds of blades, and a NACA airfoil blade having the same airfoil parameters c, $x_c$ and t as the above LF airfoil.

The results illustrated in FIG. 18 show that the cut-in wind speed Wi of the FW41BL blade is 1.5 m/s, the cut-in wind speeds Wi of the FW31BL blade, the FW312L blade and the G3d2L blade are all 2 m/s, while the cut-in wind speeds Wi of the LF blade and the NACA blade are respectively 3.5 m/s and 4 m/s.

As seen from the comparison results illustrated in FIG. 19, the power curves listed in a descending power order are as follows: the FW41BL blade, the G3d2L blade, the FW312L blade, the FW31BL blade, the LF blade and the NACA blade.

Table 1 lists an average $\overline{C}p$ of the wind power utilization coefficient Cp varying with the wind speed, a cut-in wind speed Wi and an acceleration period T from starting of rotation to an equilibrium rotation speed, measured at a wind speed Wi up to 13 m/s when the six kinds of blades are mounted on a same high-efficient wind turbine.

TABLE 1

Average $\overline{C}p$ of Cp varying with wind speed, measured when the
six kinds of blades are mounted on a same high-efficient wind turbine

| Performance parameters | BLADE | | | | | |
| --- | --- | --- | --- | --- | --- | --- |
| | FW41BL | G3d2L | FW312L | FW31BL | LF airfoil | NACA airfoil |
| $\overline{C}p$ (an average at Wi up to 13 m/s) | 0.50 | 0.47 | 0.47 | 0.46 | 0.33 | 0.27 |
| cut-in wind speed Wi(m/s) | 1.5 | | 2 | | 3.5 | 4 |
| acceleration period T @Wi from starting of rotation to an equilibrium rotation speed (s) | | 10-20 | | | 30-40 | 120-360 |

The five kinds of blades except the NACA blade have a similar shape or a similar outer profile. Among the five kinds of blades, the blade having a ventilation space have better performance than the LF blade, indicating that the configuration of the ventilation space is a key factor to improve the performance of the blades, the difference of performances of the blades is mainly resulted from the number and shape of the ventilation space. The NACA blade has the poorest performance, indicating that the aviation airfoil designed for aircrafts is not suitable for the vertical axis wind turbines.

Overall, $\overline{C}p$ of the blade of the present disclosure is not smaller than that of a G3d2L blade, while the cost of the blade of the present disclosure is less than that of the G3d2L blade by at least 20%, thus the blade of the present disclosure is more cost-effective.

The method for manufacturing the blade capable of efficiently utilizing low-velocity fluid of the present disclosure substantially includes steps of:

Step 1. selecting raw materials for processing; the raw materials include ductile light metal sheets (including, but not limited to, an aluminum plate, an aluminum alloy plate), light alloy non-sheet materials (including, but not limited to, aluminum alloy, aluminum-magnesium alloy), polymer (including, but not limited to, PC, PU and ABS), or fibers-reinforced composite (including, but not limited to, glass fibers composite, carbon fibers composite, Kevlar fibers composite).

Step 2. according to the types of the raw materials, applying curved surface mold or die forming, or curved surface rolling, to manufacture the raw materials into a sheet member having a predetermined shape; the curved surface mold or die forming includes stamping, extrusion, injection molding, die casting, loose tooling die forming or patterned mold forming;

Specifically, when the raw materials are light metal sheets, applying curved surface rolling or stamping; when the raw materials are light alloy non-sheet materials or polymer materials, applying extrusion, injection molding or die casting; when the raw materials are fiber reinforced composite, applying die or patterned mold forming, or die casting.

Step 3. forming the head wing piece, the middle wing piece or the tail wing piece using the manufactured sheet members.

What described above are several embodiments of the present disclosure, they are relatively concrete and detailed, but they are not intended to limit the scope of the present invention. It will be understood by those skilled in the art that various modifications and improvements can be made without departing from the conception of the present disclosure, and all these modifications and improvements are within the scope of the present invention. The scope of the present invention shall be subject to the claims attached.

What is claimed as:

1. A blade capable of efficiently utilizing low-velocity fluid, comprising a main wing component, the main wing component has a streamlined cross section having a first outer profile which forms a first airfoil, wherein, the blade further comprises a head wing piece in form of a sheet, the head wing piece has an arc-shaped cross section with a convex surface at one side and a concave surface at the other side, the head wing piece is arranged obliquely above a leading-edge point of the main wing component with the concave surface of the head wing piece facing the main wing component, and a first ventilation space is formed between the head wing piece and the main wing component;

a second outer profile defined by the convex surface of the head wing piece and part of an upper profile, a trailing-edge point, and a lower profile of the main wing component forms a second airfoil, and a leading-edge point of the second airfoil is located at a convex profile of the head wing piece;

the main wing component comprises one tail wing piece and at least one middle wing piece located between the head wing piece and the tail wing piece, at least one second ventilation space is formed between the at least one middle wing piece and the tail wing piece to achieve air communication between the upper profile and the lower profile of the second airfoil, an opening of the second ventilation space close to the lower profile of the second airfoil is an air inlet of the second ventilation space, an opening of the second ventilation space close to the upper profile of the second airfoil is an air outlet of the second ventilation space, and the air inlet has a greater width than the air outlet of the second ventilation space;

the at least one middle wing piece comprises a first sheet member at least partially arranged along the upper profile of the second airfoil;

the first sheet member has an arc-shaped cross section with a convex surface at one side and a concave surface at the other side, the arc-shaped convex surface of the first sheet member is close to the head wing piece, the first sheet member has one end close to the lower profile of the second airfoil and another end located at the upper profile of the second airfoil;

the at least one middle wing piece further comprises a second sheet member, one end of the second sheet member is connected with one end of the first sheet member close to the lower profile of the second airfoil, and the second sheet member comprises a lower section arranged along the lower profile of the second airfoil and extending towards the tail wing piece;

the second sheet member further comprises a middle section connected with the lower section, and the middle section is bent towards the first sheet member connected with the second sheet member;

a bending angle between the lower section and the middle section of the second sheet member is an obtuse angle, alternatively, the second sheet member further comprises an upper section connected with the middle section at one end, and another end of the upper section is connected to the concave surface of the first sheet member.

2. The blade of efficiently utilizing low-velocity fluid of claim 1, wherein, a gap between one end of the head wing piece close to the lower profile of the main wing component and the main wing component is an air inlet of the first ventilation space, a gap between one end of the head wing piece close to the upper profile of the main wing component and the main wing component is an air outlet of the first ventilation space, and the air inlet has a greater width than the air outlet of the first ventilation space.

3. The blade of efficiently utilizing low-velocity fluid of claim 2, wherein, an air outflow direction of the air outlet of the first ventilation space is along a tangential direction at a corresponding location of the upper profile of the main wing component.

4. The blade of efficiently utilizing low-velocity fluid of claim 1, wherein, a first connection member is provided between the middle section of the second sheet member and the concave surface of the first sheet member.

5. The blade of efficiently utilizing low-velocity fluid of claim 1, wherein, the lower section of the second sheet member is connected to the first sheet member through a second connection member, and a connection of the second connection member and the second sheet member and a connection of the second connection member and the first sheet member are smooth and rounded; alternatively, a connection of the first sheet member and the lower section of the second sheet member is smooth and rounded, and is provided with a first reinforcing member at an inner side thereof; further alternatively, the first sheet member and the second sheet member connected thereto are formed integrally.

6. The blade of efficiently utilizing low-velocity fluid of claim 1, wherein, the first sheet member and the second sheet member are connected to form a closed cavity, which is provided therein with a filling body; alternatively, the first sheet member, the second sheet member and the filling body are integrated to form a solid middle wing piece.

7. The blade of efficiently utilizing low-velocity fluid of claim 1, wherein, the tail wing piece has a streamlined cross section, an outer profile of which forms a third airfoil, a lower profile of the third airfoil is at least partially arranged along the lower profile of the second airfoil, an upper profile of the third airfoil is at least partially arranged along the upper profile of the second airfoil, and trailing-edge points of the third airfoil coincide with those of the second airfoil.

8. The blade of efficiently utilizing low-velocity fluid of claim 7, wherein, the tail wing piece comprises a fourth sheet member arranged along the upper profile thereof and a fifth sheet member arranged along the lower profile thereof, and two ends of the fourth sheet member are respectively connected with two ends of the fifth sheet member.

9. The blade of efficiently utilizing low-velocity fluid of claim 8, wherein, two ends of the fourth sheet member are respectively connected with two ends of the fifth sheet member through a third connection member and a fourth connection member; alternatively, at least one second reinforcing member is arranged between the fourth sheet member and the fifth sheet member; further alternatively, one end of the fifth sheet member close to the head wing piece is connected with an extending section arranged along the lower profile of the second airfoil.

10. The blade of efficiently utilizing low-velocity fluid of claim 9, wherein, one end of the fourth sheet member close to the head wing piece is connected with an attaching section attached with the extending section; alternatively, one end of the extending section close to the head wing piece is connected with a bending section bent towards the upper profile of the second airfoil.

* * * * *